US008594933B2

(12) United States Patent
Neugebauer et al.

(10) Patent No.: US 8,594,933 B2
(45) Date of Patent: Nov. 26, 2013

(54) TRANSMISSION OF SENSOR DATA BASED ON GEOGRAPHICAL NAVIGATION DATA

(75) Inventors: Mario Neugebauer, Dresden (DE); Juergen Anke, Dresden (DE)

(73) Assignee: SAP AG, Walldorf (DE)

( * ) Notice: Subject to any disclaimer, the term of this patent is extended or adjusted under 35 U.S.C. 154(b) by 1385 days.

(21) Appl. No.: 11/351,466

(22) Filed: Feb. 9, 2006

(65) Prior Publication Data

US 2007/0185646 A1 Aug. 9, 2007

(51) Int. Cl.
*G01C 21/00* (2006.01)

(52) U.S. Cl.
USPC ........ 701/484; 340/993; 455/456.6; 701/408; 701/461

(58) Field of Classification Search
USPC .......... 701/201, 400, 408, 461, 484; 700/200; 340/988, 989, 990, 991, 996, 994, 340/995.1, 995.14, 995.23, 995.28; 455/456.1, 456.6, 512
See application file for complete search history.

(56) References Cited

U.S. PATENT DOCUMENTS

| | | | | |
|---|---|---|---|---|
| 4,740,792 | A * | 4/1988 | Sagey et al. | 342/457 |
| 5,179,374 | A * | 1/1993 | Winger | 455/440 |
| 5,214,789 | A * | 5/1993 | George | 455/440 |
| 5,235,633 | A * | 8/1993 | Dennison et al. | 455/456.3 |
| 5,594,739 | A * | 1/1997 | Lemieux | 370/350 |
| 5,966,658 | A * | 10/1999 | Kennedy et al. | 455/426.1 |
| 6,055,426 | A | 4/2000 | Beasley | |
| 6,721,278 | B1 * | 4/2004 | Rimhagen et al. | 370/252 |
| 6,941,194 | B1 * | 9/2005 | Dauner et al. | 701/1 |
| 7,466,218 | B2 * | 12/2008 | Oesterling | 340/426.18 |
| 2001/0022585 | A1 * | 9/2001 | Endo et al. | 345/427 |
| 2002/0188562 | A1 * | 12/2002 | Igarashi et al. | 705/40 |
| 2004/0192336 | A1 | 9/2004 | Walby | |
| 2004/0240404 | A1 * | 12/2004 | Ibrahim et al. | 370/312 |
| 2005/0038581 | A1 * | 2/2005 | Kapolka et al. | 701/29 |
| 2006/0009211 | A1 * | 1/2006 | Sato | 455/423 |
| 2007/0078528 | A1 * | 4/2007 | Anke et al. | 700/21 |
| 2007/0153802 | A1 * | 7/2007 | Anke et al. | 370/395.42 |

* cited by examiner

*Primary Examiner* — Khoi Tran
*Assistant Examiner* — Stephen Holwerda
(74) *Attorney, Agent, or Firm* — Kenyon & Kenyon LLP

(57) ABSTRACT

A method and apparatus for sensor data transmission in a mobile device includes receiving sensor data and generating a sensor data packet therefrom. The method and apparatus further includes receiving navigation data relating to the movements of the mobile device from a navigation device and receiving network data including transmission areas for one or more transmission mediums from a network availability database. The method and apparatus includes assigning a priority term to the sensor data packet, which may be based on predetermined priority levels. The method and apparatus thereupon includes determining a transmission technique for transmitting the sensor data packet to a back end processing device based on the priority term, the network data and the navigation data.

25 Claims, 3 Drawing Sheets

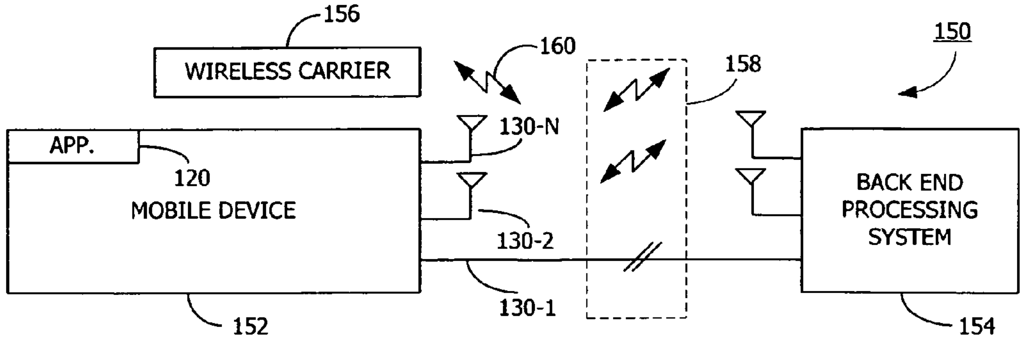
FIG. 3
172 174 170
| EVENT | PRIORITY LEVEL |
|---|---|
| EVENT_1 | CRITICAL |
| EVENT_2 | SIGNIFICANT |
| EVENT_3 | INFORMATIVE |
| ⋮ | ⋮ |
| EVENT_N | RECORDABLE |
FIG. 4
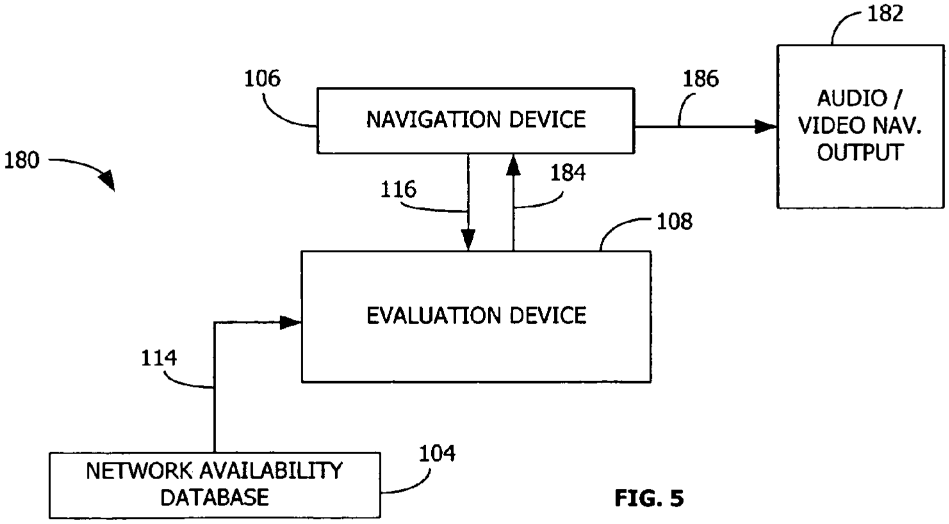
FIG. 5

TRANSMISSION OF SENSOR DATA BASED ON GEOGRAPHICAL NAVIGATION DATA

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF THE INVENTION

The present invention relates generally to transmitting sensor data from a mobile device and more specifically to evaluating sensor data and controlling the transmission of data packets from the mobile device (e.g. a motor vehicle) to a back end processing system based in part on navigation information and network availability.

Existing predictive maintenance systems allow for early determinations of anticipated problems with operational devices. In these systems, product embedded information devices (PEIDs), which may be embodied as sensors, record the various operational aspects of a device. These PEIDs can record various factors, such as oil pressure, fluid levels, operating efficiency, time since previous repairs, locations, and other factors.

An existing predictive maintenance technique is a resident calculation technique in which an on-board computing system analyzes sensor data for the mobile device. For example, the mobile device may be an automobile or piece of heavy construction equipment that may travel to various locations over the course of a day. In addition, the mobile device may also include navigational processing systems, such as a global positioning system (GPS) receiver that coordinates a physical location of the mobile device with a map database providing a visual or audio indication of the mobile device's location. These navigational systems also include planning a route for the mobile device and providing driving directions to the controller of the mobile device.

Due to size and processing limitations, mobile devices do not have the capacity for sophisticated levels of computation as it relates to the events determined by the sensors. These systems can provide basic computing ability, which typically consists of comparing a sensor data reading to a chart of ranges. If the sensor data is outside of the range, the processing device may then provide a cursory notification. For example, if the oil level is below a threshold level, an oil light may be illuminated. These on-board systems are restricted to basic computations of a binary determination of whether a component's operation is either inside or outside of a predetermined operating range.

Another predictive maintenance technique includes using a back end processing system to perform various levels of calculations on the sensor data. This technique is typically limited to stationary devices because there is a dedicated communication path between the device and the back end processing system. It can be beneficial to communicate the data packet between the remote device and the back end processing system, but problems exist in the limited amount of data that can be exchanged therebetween. The back end processing system may be able perform a larger variety of processing operations on this data packet than available with the on-board processing system of the remote device. The back end processing system may also be able to additionally cross reference the sensor data with a large collection of information available in a networked environment, thereby providing a greater degree of analysis than currently locally available on the remote device.

Limitations associated with the remote device communicating with the back end processing system include the remote device's location and ability, as well as costs, to transmit data. The remote device may include the ability to transmit data over different mediums (e.g. WLAN, cellular, Bluetooth, terrestrial, etc.) Each medium includes corresponding factors, such as transmission range, cost and available bandwidth. For example, a WLAN connection may have little cost and a high bandwidth, but a very limited transmission range. Conversely, the terrestrial connection may have extremely high costs, limited bandwidth and an almost global transmission range.

As the mobile device includes the ability to communicate across numerous transmission mediums, it is beneficial to determine which data should be sent over which transmission medium and when the data can be sent. Currently, mobile devices include the ability to collect the sensor data and transmit the data over one of several available transmission mediums. These existing techniques fail to provide for the transmission costs, but rather coordinate data transmission based on transmitting when one of several networks become available. Existing techniques further do not utilize positioning information in making transmission determinations. Based on the varying degrees of transmission mediums, it would be beneficial to efficiently detect and select various transmission techniques as associated with the corresponding event detected by the sensor.

BRIEF DESCRIPTION OF THE DRAWINGS

FIG. 3 illustrates a block diagram of a system having sensor data transmission from a mobile device to a back end processing system;

FIG. 4 illustrates a graphical representation of a priority term database;

FIG. 5 illustrates a block diagram of one embodiment of an apparatus for sensor data transmission in a mobile device.

DETAILED DESCRIPTION OF THE INVENTION

Sensor data collected on a mobile device may be transmitted using different available transmission techniques, including transmission over various wireless mediums. The sensor data may be afforded a priority level and the priority level associated with one or more of the transmission techniques. The transmission of the sensor data may also be determined based on navigational data as determined by the navigation system and network availability information. Therefore, sensor data may be transmitted based on its priority level, the navigational information of the mobile device and the network availability for the various wireless transmission mediums.

Figure 1:
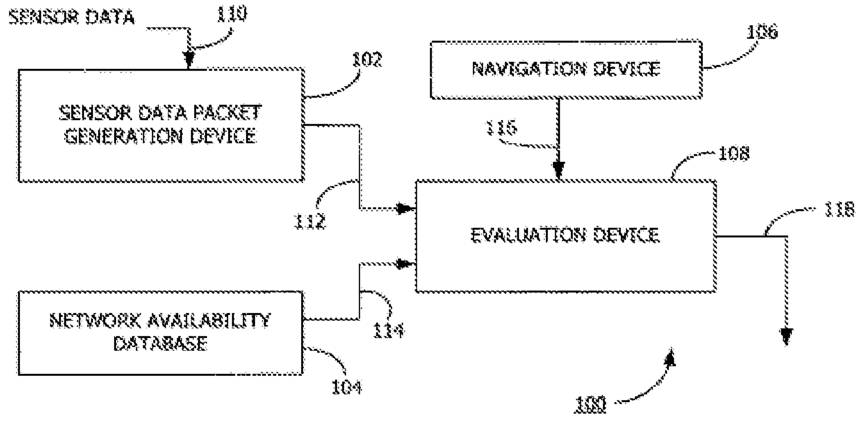
FIG. 1 illustrates a block diagram of one embodiment of an apparatus for sensor data transmission in a mobile device.

FIG. 1 illustrates an apparatus 100 including a sensor data packet generation device 102, a network availability database 104, a navigation device 106 and an evaluation device 108.

The sensor data packet generation device 102, navigation device 106 and evaluation device 108 may be one or more processing devices performing executable operations through hardware or software encoding. The network availability database 104 may be any suitable type of storage device storing data therein accessible by the evaluation device 108.

In one embodiment, the sensor data packet generation device 102 receives sensor data 110, typically received from a sensor. The sensor data packet generation device 102 may perform one or more processing functions associated with the sensor data 110 to generate a sensor data packet 112. For example, the sensor data 110 may be raw data from the sensor that the device 102 converts into another format readable by a different processing system (such as a back end processing system). In another example, the sensor data 110 may be processed to generate a sensor data packet including additional information, such as a time stamp, mobile device identification data, sensor identification data and/or other data. In another embodiment, the sensor data packet 112 may include just the raw sensor data 110. The sensor data packet generation device 102 provides the sensor data packet 112 to the evaluation device 108. In another embodiment, the sensor data packet may include additional information usable outside of the mobile device. For example, an on-board computer may generate diagnostic messages that contain pre-processed information, usable by a back end processing system.

In the apparatus 100, the network availability database 104 has network data stored therein, where the network data includes information as to transmission areas for the different available wireless transmission mediums. For example, a first transmission medium may be a wireless local area network (WLAN) that has limited transmission areas based on the placement of receivers. The transmission areas, such as may commonly be referred to as hotspots, may be geographically indicated relative to positioning information, for example using longitude and latitude designations. As discussed in further detail below, this information may be periodically updated to reflect changes in reception areas for transmission areas. The network availability database 104 provides the network data 114 to the evaluation device 108.

In the apparatus 100, the navigation device 106 generates navigation data relating to the position of the mobile device, within which the apparatus 100 may be disposed. In one example, the navigation data may include not only position information, but also route information indicating intended travel locations. The navigation data may include global positioning information, such as longitude and latitude information. In one embodiment (not specifically illustrated) the apparatus 100 may include a receiver to receive terrestrial positioning information, commonly referred to as global positioning information. In the navigation system, this information is used to direct the mobile device along prescribed paths, such as giving specific driving directions and indicating when a vehicle is off-route. The navigation data 116 is provided to the evaluation device 108.

Within the evaluation device 108, the device 108 is operative to assign a priority term to the sensor data packet 112. The assignment of this priority term may be based on a pre-existing designation of the sensor data packet 112 being associated with a corresponding priority level. In the apparatus 100, the various possible outputs of the sensors are known and priority levels are predetermined based on these possible outputs. For example, it is known that a sensor may generate sensor data within one of several ranges; when the data is outside of a range, this may be given a corresponding priority level. As described in further detail below, one embodiment may include priority levels respectively labeled as “critical,” “significant,” “informative and “recordable.” In another embodiment, the priority may be based on one or more of the sensor data packets 112 relating to each other. For example, multiple low priority events may be upgraded to a higher priority level.

The evaluation device 108 may thereupon determine a transmission technique for transmitting the sensor data packet 112 based on the priority term, the network data 114 and the navigation data 116. The transmission technique may include the selection of a particular transmission medium and the selection of recording the sensor data packet for later transmission. For example, if the sensor data packet is deemed merely informative, the evaluation device may seek to transmit the sensor data packet with a transmission technique identifier 118 using an available low cost transmission medium, where availability may be determined based on the navigation data 116 and the network data 114. In another example, if the sensor data is deemed critical, the evaluation device may determine to send the sensor data packet 112 using a highly expensive transmission medium to insure the data is properly transmitted. In another example, if the sensor data packet 112 has a very low priority, it may be internally recorded for transmission to a back end processing system when the vehicle is being serviced.

Figure 2:
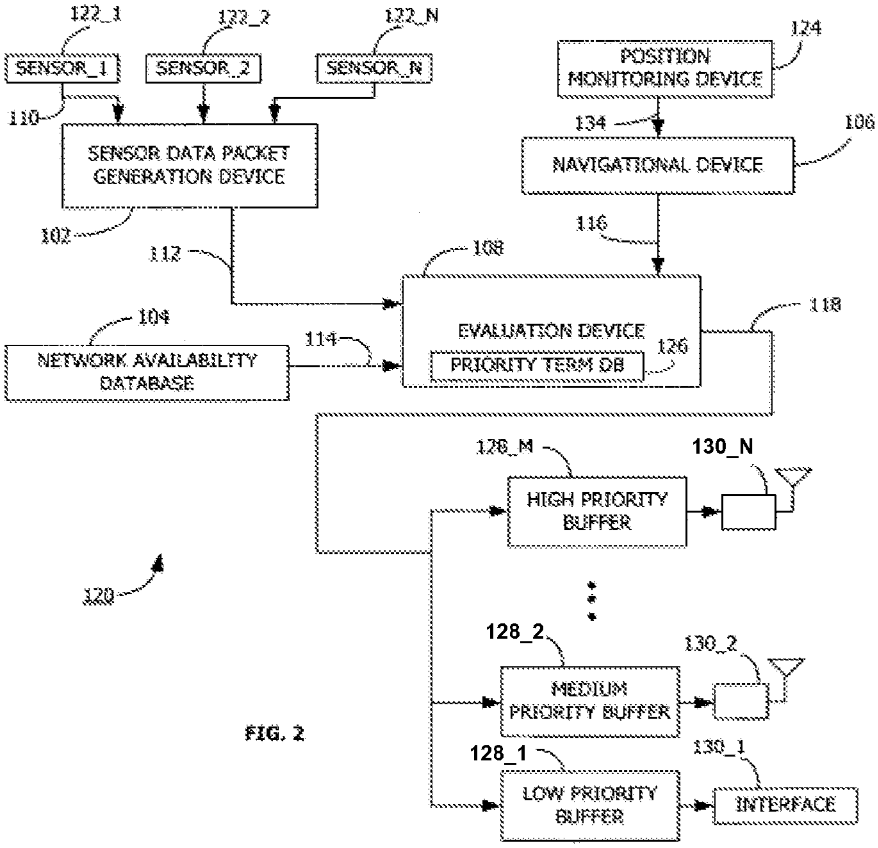
FIG. 2 illustrates a block diagram of another embodiment of an apparatus for sensor data transmission in a mobile device.

FIG. 2 illustrates an apparatus 120, similar to the apparatus 100 of FIG. 1 including the sensor data packet generation device 102, the network availability database 104, the navigational device 106 and the evaluation device 108. The apparatus 120 further includes a plurality of sensors 122_1, 122_2 and 122_N, where N represents any suitable integer value (collectively referred to as 122), a position monitoring device 124, a priority term database 126 disposed within the evaluation device 108, a plurality of priority buffers 128_1, 128_2, 128_M, where M represents any suitable integer (collectively referred to as 128) and a plurality of transmission devices 130_1, 130_2, 130_M (collectively referred to as 130).

The sensors 122 may be any suitable type of sensing device capable of generating sensor data 110 providing information as to one or more components, elements, operational features or other information being sensed. For example, in one embodiment, the sensor 122 may be one or more PEIDs measuring engine characteristics of a motor vehicle or a passive element such as an RFID tag. The position monitoring device 124 may be a receiver/transmitter for determining global positioning information 134 usable by the navigation device 106. The priority term database 126 may be one or more storage device having priority terms stored therein which as described above may include pre-populated data relating to various sensor readings 110 from the sensors 122. The priority buffers 128 may also be any suitable memory device operative to store sensor data packets for transmission, where the transmission devices 130 may include transmitters for wirelessly transmitting the sensor data packet using one or more wireless transmission mediums. In another transmission technique, the transmission device 130_1 may include an interface for physical connection not necessarily using a wireless transmission, such as may be found when the mobile device is connected to a back end processing system for routine maintenance.

In one embodiment of operation, the apparatus 120 includes one or more of the sensors 122 providing the sensor data 110 to the sensor data packet generation device 102. The device 102 generates the sensor data packet 112 as described above with respect to FIG. 1. In one embodiment, the position monitoring device 124 provides position data 134 to the navigation device 106, such as longitude and latitude readings based on a satellite transmission or other positioning system. The navigation device 106 generates and provides the navigation data 116 to the evaluation device 108. Additionally, the evaluation device 108 receives the network data 114 from the network availability database 104, where in one embodiment this network data 114 may be retrieved based on navigational data 116 including the mobile device's position information as well possibly including route information indicating the mobile device's intended route of travel.

Similar to the embodiment described above with respect to FIG. 1, the evaluation device assigns a priority term to the sensor data 112 based on accessing the priority term database 126. In one embodiment, the priority term database 126 may be a look-up table accessed using the sensor data packet 112 based on the predetermination of various types of sensor data 132 that may be generated by the sensors 122. In another embodiment, the priority term database 126 may also include priority levels based on sequencing of multiple events, such as upgrading a predetermined priority level if one or more events have previously occurred. The evaluation device 126 is then operative to determine a transmission technique based on the priority term, the network data 114 and the navigation data 116. This sensor data with the determination of a transmission technique 118 is provided for subsequent transmission to a back end processing system based on the designated transmission technique.

In one embodiment, as illustrated in FIG. 2, the apparatus 120 may include a variety of available transmission techniques. A first technique may be recording the sensor data packet in a low priority buffer 128_1 connected to the interface 130_1. This embodiment may provide for internal storage of low priority sensor data packets not requiring wireless transmission, but rather containing sensor data that may be utilized when a back end processing system is physically connected to the interface 130_1. In one embodiment, the back end processing system may receive the data from the buffer 108_1 when the mobile device is being serviced and a computing network is physically connected to the interface.

The apparatus 120 may also include other buffers 128 associated with wireless transmission devices 130_2 and 130_N. The transmission devices 130_2 and 130_N may provide wireless transmission using different transmission mediums. For example, a medium level priority transmission may be made using a WLAN connection that has limited range but has a very low transmission cost and high priority transmissions may be preferred using a cellular or a terrestrial transmission medium having a high transmission range with a high transmission costs. In one embodiment, the sensor data packets may be provided directly to the transmission devices 130, if the transmission medium is readily available and there is not need to temporarily store the packet in the buffer 128.

As noted above, in one exemplary embodiment, there may be four selected priority levels. The critical level may indicate that the mobile device requires immediate examination. For example, in a fleet vehicle, a critical level may indicate that vehicle should drive directly to nearest service station for examination or that further analysis of the data is immediately required and the back end processing system should receive the event data packet as quickly as possible. In the event the data is to be immediately transmitted, the urgency may require using whatever transmission medium available regardless of transmission costs. For example, in operating the mobile device, if a vibration occurs at the rear axle of the vehicle, an event entitled "vibration at rear axis" may be created. The measured vibration data may be given a priority level of critical based on the priority term database 126. Thereupon, this sensor data may be transmitted using the available wireless medium.

The second exemplary level may be termed significant, which indicates that further examination of the mobile device or specific components of the mobile device is required soon. This level may indicate that the back end processing system should quickly receive the sensor data, but does have to immediately receive the data. For example, an engine sensor may determine that the engine oil measures above a threshold operating temperature for an extended period of time, generating a "high oil temperature" event. This even may be deemed significant. In the significant priority determination, the location data may be utilized to determine network availability of a selected transmission medium. As described in further detail below, this may include adjusting the routing information of a mobile device to including being within a transmission area for one of the transmission mediums.

There are three exemplary scenarios with the significant priority setting. If, based on examining the network data and the navigation data, the mobile device will pass into a transmission area, the event data may be temporarily stored, such as in the buffer 128, until the mobile device enters the transmission area. If there is not network access within a predefined time interval and there are other transmission mediums available, based on a comparison of the transmission areas with the navigation data, a second scenario may include adjusting the routing of the mobile device to enter a transmission area. In this scenario, the mobile device may transmit a portion of the sensor data packet using a currently available medium (which may be more costly) and then complete the transmission once the mobile device is re-routed into the transmission area for the originally intended transmission medium. In a third exemplary scenario, if it is determined that the transmission will not be readily available, the priority level and/or the transmission medium may be adjusted, such as selecting a more expensive medium that is currently available or determining to store the data until the vehicle is within a designated transmission range.

The third exemplary level may be informative. This may include instructions to transmit the event data to a specific recipient, such as a fleet manager instead of the back end processing system. For example, a sensor may determine that there is an elevated share of noxious fumes in the exhaust gas and create a "noxious fumes share high," which may be deemed informative. Based on the informative setting, the transmission technique may include transmitting the information on a low cost medium and performing the transmission when the medium becomes available. The information priority level would not include adjusting the routing information and does not engage a higher cost transmission medium, thereby saving processing requirements, reducing the need to re-route the mobile device and reduce extra transmission costs.

The fourth exemplary level may be recordable. This is a lowest priority setting where the sensor data does not need to be wirelessly transmitted, for example the sensor may determine that a wireless door lock function failed. Therefore, with the recordable setting, the sensor data may simply be stored on a local memory (e.g. 128) until the mobile device is being serviced and this sensor data can be manually retrieved from the device.

FIG. 3 illustrates a system 150 including a mobile device 152, a back end processing system 154 and a wireless carrier transmission device 156. The mobile device 152 includes the apparatus 120 as described above with respect to FIG. 2 (or the apparatus 100 as described above with respect to FIG. 1), as well as the transmission devices 130. The back end processing system 154 may be any suitable processing system used to process sensor data associated with the mobile device 152. For example, the back end processing system 154 may be a processing network maintained by the manufacturer of the mobile device 152 to provide vehicle or safety information. The wireless carrier transmission device 156 provides transmissions from one or more wireless carriers, including updated transmission area data indicating coverage areas for the wireless mediums.

In the operation of the mobile device 152, the apparatus 120 generates the sensor data packets for transmission to the back end processing system 154. Based on the transmission technique determination, the mobile device 152 uses one of the available transmission techniques 130, to provide a transmission 158 of the sensor data packet to the back end processing system 154. For example, if a wireless transmission is selected, the suitable wireless transmission medium is used. In the back end processing system, this data may then be analyzed for further processing, as described in further detail below.

In another embodiment of the system 150, the mobile device 152 is also operative to be in wireless communication with the wireless carrier 156. This communication may include the reception of network availability data 160 indicating the available network area for the corresponding wireless medium. For example, if the transmission is a cellular transmission, the network availability data 160 may include the geographical designations of areas having network availability, possibly including signal strength for different areas. As the wireless carriers improve transmission capabilities and install or utilize more wireless equipment, the network availability evolves; therefore, through communication, the network availability data 160 stored in the network availability database (104 of FIGS. 1 and 2) is updated accordingly.

FIG. 4 illustrates a graphical representation of one embodiment of a priority term database 170 including a plurality of sensor data events 172 and corresponding priority terms 174. As described above, in one embodiment, the database 170 includes predefined events 172 that may occur within the mobile device, for example an event may be a designated sensor having a reading above a defined threshold value. This predefinition of events may be based on knowledge of the sensors in the mobile device and the various types of readings that the sensors are capable of producing. With this knowledge, each possible type of reading can be associated with a priority level. For example, the database includes N number of events having different exemplary priority levels of critical, significant, informative and recordable. Based on this information, the evaluation device (108 of FIGS. 1 and 2) may then retrieve the corresponding priority level 174 based on designated event 172 indicated in the sensor data.

FIG. 5 illustrates one embodiment of an apparatus 180 including the evaluation device 108, the network availability database 104 and the navigation device 106. The apparatus 180 further includes an audio/video navigational output device 182, which may be a video or other type of display, an audio output device such as speakers or a combination thereof. The device 182 may be a typical navigation display used in a mobile device to provide user interaction for standard navigation activities as recognized by one having ordinary skill in the art.

The evaluation device 108 determines the priority term as described above and determines the transmission technique based on the network data 114 and the navigation data 116. Although, in this embodiment, the evaluation device 108 is further operative to determine if there should be an adjustment of the navigation data 116 based on the network data 114. For example, if it is determined that the mobile device can enter a transmission area by re-routing the mobile device, the evaluation device 108 may seek to adjust the navigation data.

In this embodiment, the evaluation device 108, in response to executable instructions, may compare the selected transmission technique with the network data 114 to determine if the mobile device can be routed to drive within a transmission area. This may include examining the full navigation route of the navigation data 116 to determine if a transmission area is included. This may further include examining other available transmission techniques and potentially adjusting the transmission technique to corresponding to available transmission areas or areas becoming available based on the navigation data.

In the embodiment of FIG. 5, the evaluation device 108 may also generate navigation adjustment data 184 provided to the navigation device 106. This adjustment data 184 may include additional routing points that the navigation device 106 may use to adjust the route of the mobile device. For example, the adjustment data 184 may include one or more geographic locations or a range of locations which indicate transmission areas. The navigation device 106, using these data points, may then recalculate the navigational route to fall within one of the transmission area.

In its operation, the navigation device 106 submits updating information 186 to the output device 182. This updating information may include a visual indication that the vehicle is being re-routed, as well as a change in the navigation instructions. For instance, a vehicle may be instructed to turn off the previously designated route and take a new route. The evaluation device 108 further provides the sensor data packet for available transmission so that when the vehicle is within the transmission range, the sensor data packet is thereupon wirelessly transmitted, similar to the embodiments described above. Therefore, the evaluation device 108, in conjunction with the network data 114, may re-route the mobile device to allow for the transmission of a prioritized sensor data packet.

Figure 6:
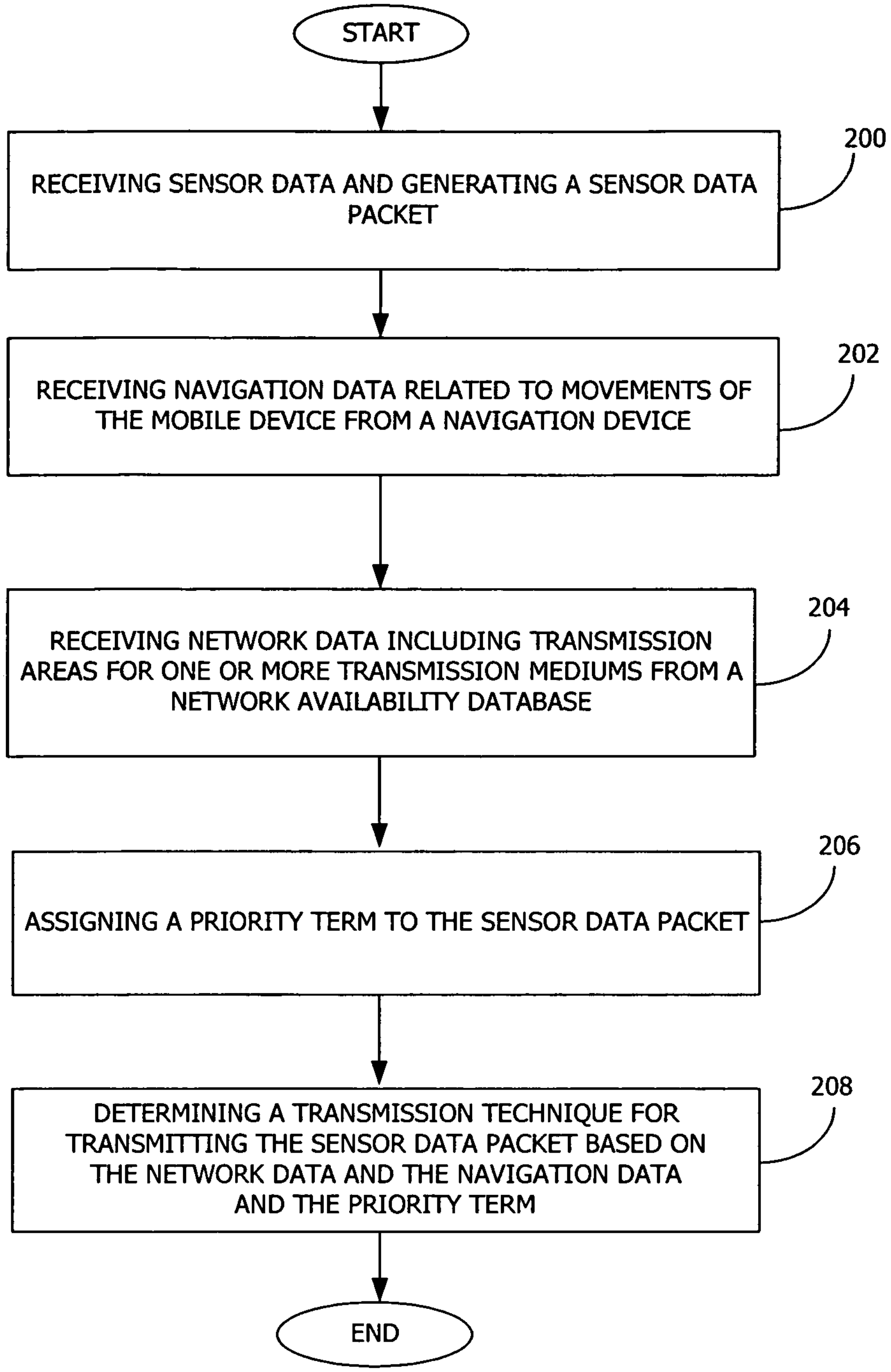
FIG. 6 illustrates a flowchart of the steps of one embodiment of a method for sensor data transmission in a mobile device.

FIG. 6 illustrates a flowchart of the steps of one embodiment of a method for sensor data transmission in a mobile device. The method may be performed by the apparatus 100 or 120 as described above with respect to FIGS. 1 and 2, respectively. A first step, step 200, is receiving sensor data and generating a sensor data packet. The sensor data may be generated by the sensors 122 disposed in the mobile device, the sensors monitoring one or more aspects of the operation of the mobile device. The next step, step 202, is receiving navigation data related to movements of the mobile device from a navigation device. The navigation device 106 may generate the navigation data 116 based on geographical positioning information as well as route information directed to the movements of the mobile device.

The next step, step 204, is receiving network data including transmission areas for one or more transmission mediums from a network availability database. The next step, step 206, is assigning a priority term to the sensor data packet. As described above, this may be done through referencing a priority term database 170, such as illustrated in FIG. 4. As the possible events 172 are predetermined, the database 170 includes the corresponding priority level terms 174. Thereupon, the next step, step 208, is determining a transmission technique for transmitting the sensor data packet based on the network data, the navigation data and the priority term. The transmission technique includes transmitting the sensor data packet to a back end processing device, whereupon prior to transmission, the sensor data packet may be temporarily stored in a buffer, such as buffers 128 of FIG. 2. In this embodiment, the method of transmitting the sensor data from a mobile device is complete.

Through this apparatus and method, sensor data may be transmitted from a mobile device to a back end processing system based, in part, on the navigation data related to the movements of the mobile device. The apparatus includes setting the priority level of the sensor data packet and then determining the technique for transmitting the sensor data packet based on the transmission areas of available networks and the current navigation data. The transmission of sensor data to the back end processing system is enhanced by addressing the known limitations of transmission availability of wireless medium relative to the priority of the event that is the subject of the sensor data packet and the geographical positioning of the mobile device, including not only current locations but also possibly addressing future routed locations of the mobile device.

Although the preceding text sets forth a detailed description of various embodiments, it should be understood that the legal scope of the invention is defined by the words of the claims set forth below. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should be understood that there exist implementations of other variations and modifications of the invention and its various aspects, as may be readily apparent to those of ordinary skill in the art, and that the invention is not limited by specific embodiments described herein. It is therefore contemplated to cover any and all modifications, variations or equivalents that fall within the scope of the basic underlying principals disclosed and claimed herein.

What is claimed is:

1. An apparatus for sensor data transmission in a mobile device, the apparatus comprising:

a sensor data packet generating device to receive sensor data and generate a sensor data packet including the sensor data, a value of the sensor data indicating a measurement taken at the sensor;

a navigation device generating navigation data relating to movements of the mobile device;

a network availability database storing network data including transmission areas for one or more transmission mediums; and an evaluation device to assign a priority level to the sensor data packet and determine a transmission technique for transmitting the sensor data packet based on the priority level, the network data, transmission cost for each of one or more transmission mediums, and the navigation data, wherein the priority level to the sensor data packet is assigned according to which data ranges the value of the sensor data belong to such that the value of the sensor data within different data ranges are assigned different priority levels, wherein the data ranges include a first data range having a low priority level, a second data range having an intermediate priority level, and a third range having a high priority level, and wherein the evaluation device is configured to determine whether there should be an adjustment of the navigation data based on the network data, and if there should be an adjustment, to generate navigation adjustment data to the navigation device.

2. The apparatus of claim 1 further comprising:

a sensor disposed within the mobile device to generate the sensor data.

3. The apparatus of claim 1 further comprising:

a plurality of transmission devices to transmit the sensor data packet using an associated one of the one or more transmission mediums.

4. The apparatus of claim 3 further comprising a plurality of priority buffers, each of the priority buffers associated with the plurality of transmission devices such that when the mobile device is within a transmission range of the one of the one or more transmission mediums associated with the priority level, the transmission device transmits the sensor data to a back end processing system using the transmission medium associated with the priority level.

5. The apparatus of claim 1 further comprising:

a priority level database including the priority terms stored therein such that the evaluation device is to assign the priority level to the sensor data packet by referencing the priority level database based on the sensor data.

6. The apparatus of claim 1 wherein:

the navigational device adjusts the navigational route of the mobile device to move within the transmission area for one of the one or more transmission mediums.

7. The apparatus of claim 1 wherein the network data within the network availability database includes the transmission areas supplied from at least one wireless carrier that provides the one or more transmission mediums.

8. A computer implemented method for sensor data transmission in a mobile device, the method comprising:

receiving sensor data and generating a sensor data packet including the sensor data, a value of the sensor data indicating a measurement taken at the sensor;

receiving navigation data relating to movements of the mobile device from a navigation device;

receiving network data including transmission areas for one or more transmission mediums from a network availability database;

assigning a priority level to the sensor data packet, wherein the priority level to the sensor data packet is assigned according to which data ranges the value of the sensor data belong to such that the value of the sensor data within different data ranges are assigned different priority levels, wherein the data ranges include a first data range having a low priority level, a second data range having an intermediate priority level, and a third range having a high priority level;

determining a transmission technique for transmitting the sensor data packet based on the priority level, the network data, transmission cost for each of one or more transmission mediums, and the navigation data; and determining whether there should be an adjustment of the navigation data based on the network data, and if there should be an adjustment, generating navigation adjustment data to the navigation device.

9. The method of claim 8,further comprising:

receiving the sensor data from a sensor disposed within the mobile device.

10. The method of claim 8 wherein a plurality of transmission devices transmit the sensor data packet using an associated one of the one or more transmission mediums, the method further comprising:

storing the sensor data packet in one of a plurality of priority buffers, each of the priority buffers associated with the plurality of transmission devices such that when the mobile device is within a transmission range of the one of the one or more transmission mediums associated with the priority level, the transmission device transmits the sensor data to a back end processing system using the one of the one or more transmission mediums associated with the priority level.

11. The method of claim 8 wherein a priority term database includes the priority level stored therein such that the assigning of the priority level to the sensor data packet includes referencing the priority level database based on the sensor data.

12. The method of claim 8 further comprising:

adjusting the navigational route of the mobile device to move within the transmission area for one of the one or more transmission mediums.

13. The method of claim 8 wherein the network data within the network availability database includes the transmission areas supplied from at least one wireless carrier that provides the one or more transmission mediums.

14. A mobile device for providing sensor data transmissions, the mobile device comprising:

a sensor to generate sensor data;

a sensor data packet generating device to receive the sensor data and generate a sensor data packet including the sensor data, a value of the sensor data indicating a measurement taken at the sensor;

a navigation device generating navigation data relating to movements of the mobile device;

a network availability database storing network data including transmission areas for one or more transmission mediums; and an evaluation device to assign a priority level and determine a transmission technique for transmitting the sensor data packet based on the priority level, the network data and the navigation data, wherein the priority level to the sensor data packet is assigned according to which data ranges value of the sensor data belong to such that the value of the sensor data within different data ranges are assigned different priority levels, wherein the data ranges include a first data range having a low priority level, a second data range having an intermediate priority level, and a third range having a high priority level, and wherein the evaluation device is configured to determine whether there should be an adjustment of the navigation data based on the network data, and if there should be an adjustment, to generate navigation adjustment data to the navigation device.

15. The mobile device of claim 14 further comprising:

a plurality of transmission devices to transmit the sensor data packet using an associated one of the one or more transmission mediums.

16. The mobile device of claim 15 further comprising a plurality of priority buffers, each of the priority buffers associated with the plurality of transmission devices such that when the mobile device is within a transmission range of the one of the one or more transmission mediums associated with the priority level, the transmission device transmits the sensor data to a back end processing system using the one of the one or more transmission mediums associated with the priority level.

17. The mobile device of claim 14 further comprising:

a priority level database including the priority levels stored therein such that the evaluation device is to assign the priority level to the sensor data packet by referencing the priority level database based on the sensor data.

18. The mobile device of claim 14 wherein:

the navigation device to adjust a navigational route of the mobile device to move within the transmission area for one of the one or more transmission mediums.

19. The mobile device of claim 14 wherein the network data within the network availability database includes the transmission areas supplied from at least one wireless carrier that provides the one or more transmission mediums.

20. The apparatus of claim 4, wherein multiple low priority events may be upgraded to a higher priority level.

21. The apparatus of claim 1, wherein the transmission technique includes transmitting a portion of the sensor data packet using one of the one or more mediums which is more costly and then, once the mobile device is in transmission range of a less costly medium of the one or more transmission mediums, completing the transmission with the latter.

22. The method of claim 8, wherein the transmission technique includes transmitting a portion of the sensor data packet using one of the one or more mediums which is more costly and then, once the mobile device is in transmission range of a less costly medium of the one or more transmission mediums, completing the transmission with the latter.

23. The mobile device of claim 14, wherein the transmission technique includes transmitting a portion of the sensor data packet using one of the one or more mediums which is more costly and then, once the mobile device is in transmission range of a less costly medium of the one or more transmission mediums, completing the transmission with the latter.

24. The apparatus of claim 1, wherein:

the evaluation device is to determine whether the mobile device will pass into a transmission area within a predetermined time based on the network data and the navigation data, if the mobile device will pass into a transmission area within a predetermined time, the evaluation device to temporarily store the sensor data packet in one of a plurality of priority buffers, each of the priority buffers associated with the plurality of transmission devices such that if the mobile device is within a transmission range of the one of the one or more transmission mediums associated with a priority level, the transmission device is to transmit the sensor data to a back end processing system using the one of the one or more transmission mediums associated with the priority term, and if the mobile device will not pass into a transmission area within a predetermined time, the evaluation device is to adjust a routing of the mobile device to enter a transmission area.

25. The apparatus of claim 8, wherein:

if based on the network data and the navigation data the evaluation device determines that the mobile device will pass into a transmission area within a predetermined time, temporarily storing the sensor data packet in one of a plurality of priority buffers, each of the priority buffers associated with the plurality of transmission devices such that when the mobile device is within a transmission range of the one of the one or more transmission mediums associated with a priority level, the transmission device transmits the sensor data to a back end processing system using the one of the one or more transmission mediums associated with the priority term, and if based on the network data and the navigation data the evaluation device determines that the mobile device will not pass into a transmission area within a predetermined time, adjusting a routing of the mobile device to enter a transmission area.

* * * * *